United States Patent
Barakat et al.

(10) Patent No.: US 11,704,666 B1
(45) Date of Patent: *Jul. 18, 2023

(54) SYSTEMS AND METHODS FOR AUTHORIZING TRANSACTIONS WITHOUT A PAYMENT CARD PRESENT

(71) Applicant: Wells Fargo Bank, N.A., San Francisco, CA (US)

(72) Inventors: Wayne Barakat, Novato, CA (US); Ha M. Duong, San Francisco, CA (US); Yvette Hatton, El Cerrito, CA (US); Chris Kalaboukis, San Jose, CA (US); Marria Rhodriquez, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/342,256

(22) Filed: Jun. 8, 2021

Related U.S. Application Data

(63) Continuation of application No. 15/426,268, filed on Feb. 7, 2017, now Pat. No. 11,037,149.

(Continued)

(51) Int. Cl.
  *G06Q 20/40* (2012.01)
  *G06Q 20/34* (2012.01)
(52) U.S. Cl.
  CPC .......... *G06Q 20/401* (2013.01); *G06Q 20/40* (2013.01); *G06Q 20/409* (2013.01); *G06Q 20/40145* (2013.01); *G06Q 20/34* (2013.01)
(58) Field of Classification Search
  None
  See application file for complete search history.

(56) References Cited

U.S. PATENT DOCUMENTS

| 8,176,159 B2 | 5/2012 | Kashi |
| 8,744,958 B2 | 6/2014 | Carlson et al. |

(Continued)

FOREIGN PATENT DOCUMENTS

| WO | WO-01/07987 A2 | 2/2001 |

OTHER PUBLICATIONS

Zhang, Feng; Aron Kondoro; and Sead Muftic. "Location-based Authentication and Authorization Using Smart Phones," 2012 IEEE 11th International Conference on Trust, Security and Privacy in Computing and Communications, Liverpool, 2012, (added to IEEE Xplore Sep. 6, 2012), pp. 1285-1292. (Year: 2012).*

(Continued)

*Primary Examiner* — Elizabeth H Rosen
(74) *Attorney, Agent, or Firm* — Foley & Lardner LLP

(57) ABSTRACT

Systems, methods, and computer-readable storage media utilized for authorizing transactions without a payment card present. One method includes receiving a habitual transaction request including a customer indicator and identifying characteristics of the habitual transaction request. The method further includes identifying, utilizing the customer indicator, habit information of a customer and authenticating the habitual transaction request based on the characteristics of the habitual transaction request conforming with the habit information. The method further includes, in response to authenticating the habitual transaction request, authorizing the habitual transaction request and receiving a non-habitual transaction request including the customer indicator. The method further includes determining that the customer is active, and the customer indicator is approved to conduct a non-habitual transaction and authorizing the non-habitual transaction request based on the determination and the customer indicator being approved to conduct the non- (Continued)

habitual transaction and transmitting a notification indicating the non-habitual transaction request was authorized.

20 Claims, 3 Drawing Sheets

Related U.S. Application Data

(60) Provisional application No. 62/440,079, filed on Dec. 29, 2016.

(56) References Cited

U.S. PATENT DOCUMENTS

| | | | |
|---|---|---|---|
| 8,774,758 | B2 | 7/2014 | Davis et al. |
| 8,955,066 | B1 | 2/2015 | Ackerman et al. |
| 9,043,887 | B2 | 5/2015 | McLachlan et al. |
| 9,331,994 | B2 | 5/2016 | Grigg et al. |
| 9,373,112 | B1 | 6/2016 | Henderson et al. |
| 10,049,361 | B2 * | 8/2018 | Kuntagod .......... G06Q 20/4016 |
| 2007/0299774 | A1 * | 12/2007 | Eaves ................. G06Q 20/102 |
| | | | 705/40 |
| 2008/0313047 | A1 * | 12/2008 | Casares ................. G06Q 20/40 |
| | | | 705/16 |
| 2011/0264500 | A1 | 10/2011 | Bouthillier et al. |
| 2012/0060214 | A1 | 3/2012 | Nahari |
| 2012/0330825 | A1 | 12/2012 | Shakkarwar |
| 2013/0073365 | A1 | 3/2013 | McCarthy |
| 2013/0124410 | A1 * | 5/2013 | Kay ....................... G07F 19/211 |
| | | | 705/43 |
| 2014/0289127 | A1 | 9/2014 | Suominen |
| 2015/0310434 | A1 | 10/2015 | Cheung |
| 2015/0356562 | A1 | 12/2015 | Siddens et al. |
| 2016/0210608 | A1 * | 7/2016 | Reany .................... G06Q 20/36 |
| 2016/0300216 | A1 | 10/2016 | Godsey et al. |
| 2017/0140378 | A1 * | 5/2017 | Rao ...................... G06Q 20/405 |

OTHER PUBLICATIONS

Konsko, Lindsay. "Why is My Credit Card Being Rejected Online?" NerdWallet, https://www.nerdwallet.com/article/credit-cards/why-credit-card-rejected-online (Jul. 29, 2014). (Year: 2014).*

Bhargav-Spantzel et al., Receipt management-transaction history based trust establishment, DIM Nov. 2, 2007, pp. 82-91.

* cited by examiner

SYSTEMS AND METHODS FOR AUTHORIZING TRANSACTIONS WITHOUT A PAYMENT CARD PRESENT

CROSS-REFERENCE TO RELATED APPLICATIONS

This application is a continuation of U.S. patent application Ser. No. 15/426,268, entitled "Systems And Methods For Authorizing Transactions Without A Payment Card Present," filed Feb. 7, 2017, which claims priority to U.S. Provisional Patent Application No. 62/440,079 entitled "Systems And Methods For Authorizing Transactions Without A Payment Card Present," filed Dec. 29, 2016, all of which are herein incorporated by reference in their entireties and for all purposes.

BACKGROUND

Financial institution customers are able to complete financial transactions in various ways, such as swiping or dipping a payment card at a transaction terminal or using a mobile wallet application on a mobile device of the customer. In some circumstances, a customer may lose or forget his or her payment card or payment device but may still want to conduct a financial transaction. In such cases, it would be advantageous for customers to be able to conduct a transaction without a payment card or payment device in their possession at the point of sale.

SUMMARY

One embodiment relates to a financial institution computing system. The system includes a network circuit enabling the financial institution computing system to exchange information over a network. The system further includes a customer database storing information for a customer including habit information of the customer and a customer indicator of the customer. The customer is associated with a financial account of the financial institution. The system further includes a transaction circuit configured to receive, over the network via the network circuit, a first transaction request including the customer indicator. The transaction circuit is further configured to authenticate the first transaction request by determining that a characteristic of the first transaction request conforms with the habit information of the customer associated with the customer indicator. The transaction circuit is further configured to authorize the first transaction request based on the first transaction request being authenticated. The transaction circuit is further configured to receive, over the network via the network circuit, a second transaction request including the customer indicator, and authorize the second transaction request based on receiving the customer indicator.

Another embodiment relates to a method performed by a financial institution computing system. The method includes receiving, by a transaction circuit over a network via a network circuit, a first transaction request including a customer indicator of a customer stored in a customer database of the financial institution. The method further includes authenticating, by the transaction circuit, the first transaction request by determining that a characteristic of the first transaction request conforms with habit information stored in the customer database of the customer associated with the customer indicator. The method further includes authorizing, by the transaction circuit, the first transaction request based on the first transaction request being authenticated. The method further includes receiving, by the transaction circuit over the network via the network circuit, a second transaction request including the customer indicator. The method further includes authorizing, by the transaction circuit, the second transaction request based on receiving the customer indicator.

Another embodiment relates to non-transitory computer readable media having computer-executable instructions embodied therein that, when executed by a transaction circuit of a financial institution computing system, causes the financial institution computing system to perform operations. The operations include receiving, over a network via a network circuit, a first transaction request including a customer indicator of a customer stored in a customer database of the financial institution. The operations further include authenticating the first transaction request by determining that a characteristic of the first transaction request conforms with habit information stored in the customer database of the customer associated with the customer indicator. The operations further include authorizing the first transaction request based on the first transaction request being authenticated. The operations further include receiving, over the network via the network circuit, a second transaction request including the customer indicator. The operations further include authorizing the second transaction request based on receiving the customer indicator.

DETAILED DESCRIPTION

Figure 1:
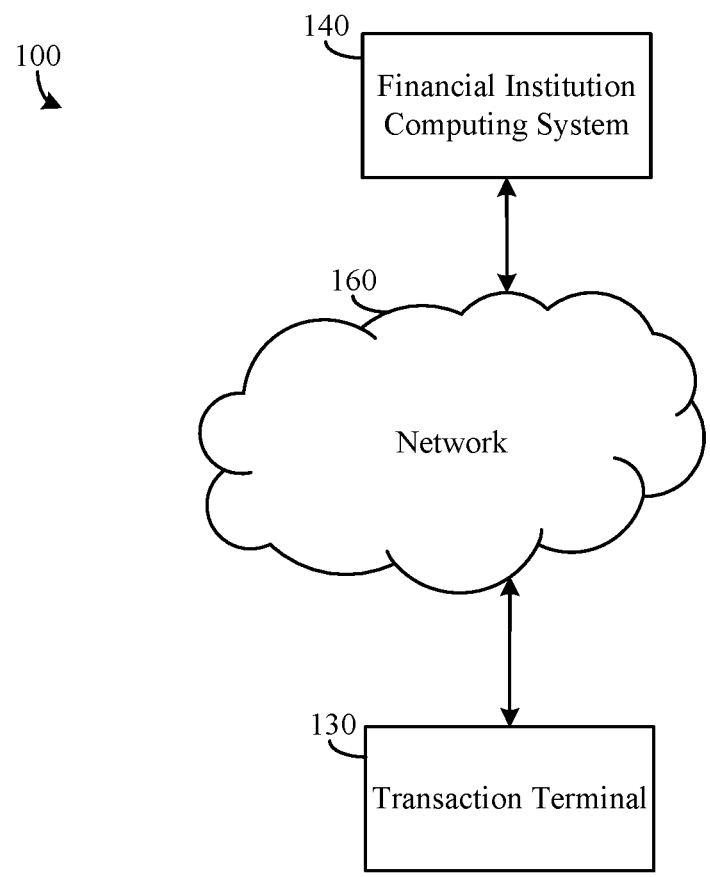
FIG. 1 is a block diagram illustrating a transaction request authorizing system, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting. For example, embodiments of systems and methods discussed herein may be relevant to any of a variety of circumstances where using a characteristic of a transaction, habit data associated with a customer, a customer indicator or other identifying information of the customer may be useful to authenticate and authorize transactions when a payment card or payment device of the customer is not present at the point of sale.

Embodiments of systems and methods for authorizing a transaction without a payment card or a payment device (e.g., a smartphone or smartwatch having a mobile wallet) are discussed below. A customer may typically conduct a transaction with a payment card. Payment cards may include, but are not limited to, credit cards, debit cards, gift cards and any other types of payment cards. A customer may also conduct a transaction with a payment device. In some circumstances, however, a customer may forget his or her wallet and thus may not have a payment card, and may not have or may also forget a payment device, but may still want to conduct one or more transactions. Certain embodiments are also directed to enabling a customer to conduct a transaction where the customer is able to present a payment card or payment device at least for one transaction, but is unable to present a payment card or payment device for other transactions.

Embodiments and implementations of the systems and methods disclosed herein improve current transaction systems and computing systems for authenticating payment transactions. In certain embodiments, a habitual transaction is authorized based on habit data of the customer. A customer indicator may be associated with the customer before or during the habitual transaction, thereby enabling subsequent transactions, including non-habitual transactions, to be authorized through entry of the customer indicator at a point of sale (e.g., via a merchant transaction terminal). In some embodiments, for example, a customer may want to conduct a habitual transaction but forgot his or her payment card, and does not have or also forgot a payment device. For example, the customer may want to buy coffee or breakfast at a merchant that he or she frequents. In such a scenario, the customer initiates a transaction request by entering a customer indicator, for example a PIN or other identifier associated with the customer, at a transaction terminal at the merchant location. A transaction circuit of the financial institution computing system receives, over a network via a network circuit, the transaction request including the indicator. The transaction circuit confirms the identity of the customer by determining that a characteristic of the transaction request conforms with habit information of the customer associated with the indicator in a customer database (e.g., the store is a store that the customer frequents often), and authorizes the transaction. After determining the identity of the customer based on the habitual transaction, and also determining that the customer is active, the financial institution computer system may allow the customer to conduct subsequent transactions using the indicator, even if the subsequent transactions are non-habitual. For example, in some embodiments, the system may allow the customer to conduct a transaction at a specific store using the indicator even if the customer has not conducted a transaction before at the specific store without also determining that the transaction is habitual.

In certain embodiments, the transaction circuit of the financial institution may authorize a subsequent transaction, for example, only if certain conditions are met. For example, a subsequent transaction may be authorized within a limited time after the habitual transaction, within a certain geographic distance of the habitual transaction, up to certain threshold amount of money, etc. For example, after conducting a habitual transaction, the customer could go to a store where the customer has not conducted a transaction before, and initiate a subsequent transaction request by entering the indicator at a transaction terminal at the store. The transaction circuit of the financial institution computing system would then receive, over a network via a network circuit, the subsequent transaction request including the indicator, and authorize the subsequent transaction request based on receiving the indicator and further based on determining that one or more of the additional conditions are met.

In certain embodiments, the customer indicator may comprise any identifying information that a financial institution computer system may use to identify a customer. In certain embodiments, the financial institution computer system may use additional identifying information, in addition to the customer indicator, to identify a customer of a habitual transaction request or of subsequent transaction requests. In certain embodiments, identifying information that may be or form part of the customer indicator, or that may be used in addition to the customer indicator may include, for example, the name of the customer, part of the name of the customer, an answer to a security or challenge question, a password, a login identifier, a personal identifier, an email address, a phone number, a zip code, an address, a location, a PIN, a photograph, biometric data, facial data, voice data, a pattern, a pattern drawn by the customer (e.g., on a screen), a pattern of movement, a signature, a fingerprint scan, an eye scan, etc., or a combination thereof. Any such identifying information may be or form part of the customer indicator or may be used in addition to the customer indicator to identify the customer, authenticate the customer, or locate the habit information associated with the customer in response to receiving the habitual transaction request or subsequent transaction requests.

In certain embodiments where a customer wishes to conduct a transaction but is not in possession of his or her payment card or payment device, a transaction circuit of a financial institution computer system can authenticate and authorize a transaction request initiated by a customer and including a customer indicator by determining that the indicator was first used by the customer for conducting a habitual transaction. The transaction circuit can further authenticate and authorize an additional transaction requested initiated by the customer and including the customer indicator even if the additional transaction request is non-habitual.

Systems, methods, and computer embodiments disclosed herein improve the accuracy of authentication procedures for transaction requests where a customer may or may not present a payment card or payment device at the point of sale. Systems, methods, and computer embodiments disclosed herein improve the functioning of transaction systems and computing systems for authenticating payment transaction requests by providing functionalities that are novel and non-obvious improvements over current systems.

Referring to FIG. 1, a block diagram illustrating a transaction request authorizing system 100 is shown according to an example embodiment. Certain embodiments of the transaction request authorizing system 100 may include a financial institution computing system 140 of a financial institution, and a transaction terminal 130. Financial institution computing system 140 and transaction terminal 130 may be configured to communicate with each other over a network 160. The network 160 may be any data exchange medium, which may include, for example, wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 160 includes the internet.

In some embodiments, transaction terminal 130 may be a computing system associated with an individual or entity with whom a customer seeks to transact (e.g., stores, merchants, service providers, etc.). Transaction terminal 130 may be configured to receive information from a customer, or for example, from an attendant at a merchant, and create a transaction request that is transmitted to the financial institution computing system 140 over network 160. As an example, the transaction request may be a request for the financial institution computing system 140 to withdraw a designated sum of funds from a customer's financial account at the financial institution and deposit the designated sum of funds into an account associated with the individual or the entity associated with the transaction terminal 130. As an example, the transaction request may be a request for the financial institution computing system 140 to credit or debit, as appropriate, a customer's financial account at the financial institution and an account associated with the individual or entity associated with the transaction terminal 130. As an example, the transaction request may be a request for the financial institution computing system 140 to transfer a designated sum of funds from the customer's financial account at the financial institution to an account associated with the individual or entity associated with the transaction terminal 130. In certain embodiments, the transaction terminal 130 may include merchant point of sale terminals, ATMs, one or more servers configured to process online or P2P transactions, and so on.

In some embodiments, the financial institution computing system 140 may be a computing system at a financial institution capable of maintaining customer accounts (e.g., payment card accounts, savings accounts, checking accounts, etc.) and databases of customer information. The financial institution may include any commercial or private financial institution, including any commercial or private banks, credit unions, credit card companies, investment brokerages, or the like. In response to a received transaction request, the financial institution computing system 140 may be configured to authorize the transaction request, withdraw and deposit funds, debit an account, credit an account, transfer funds, etc., or transmit a message back to the transaction terminal 130 or to a customer indicating whether a transaction request was approved or denied.

Figure 2:
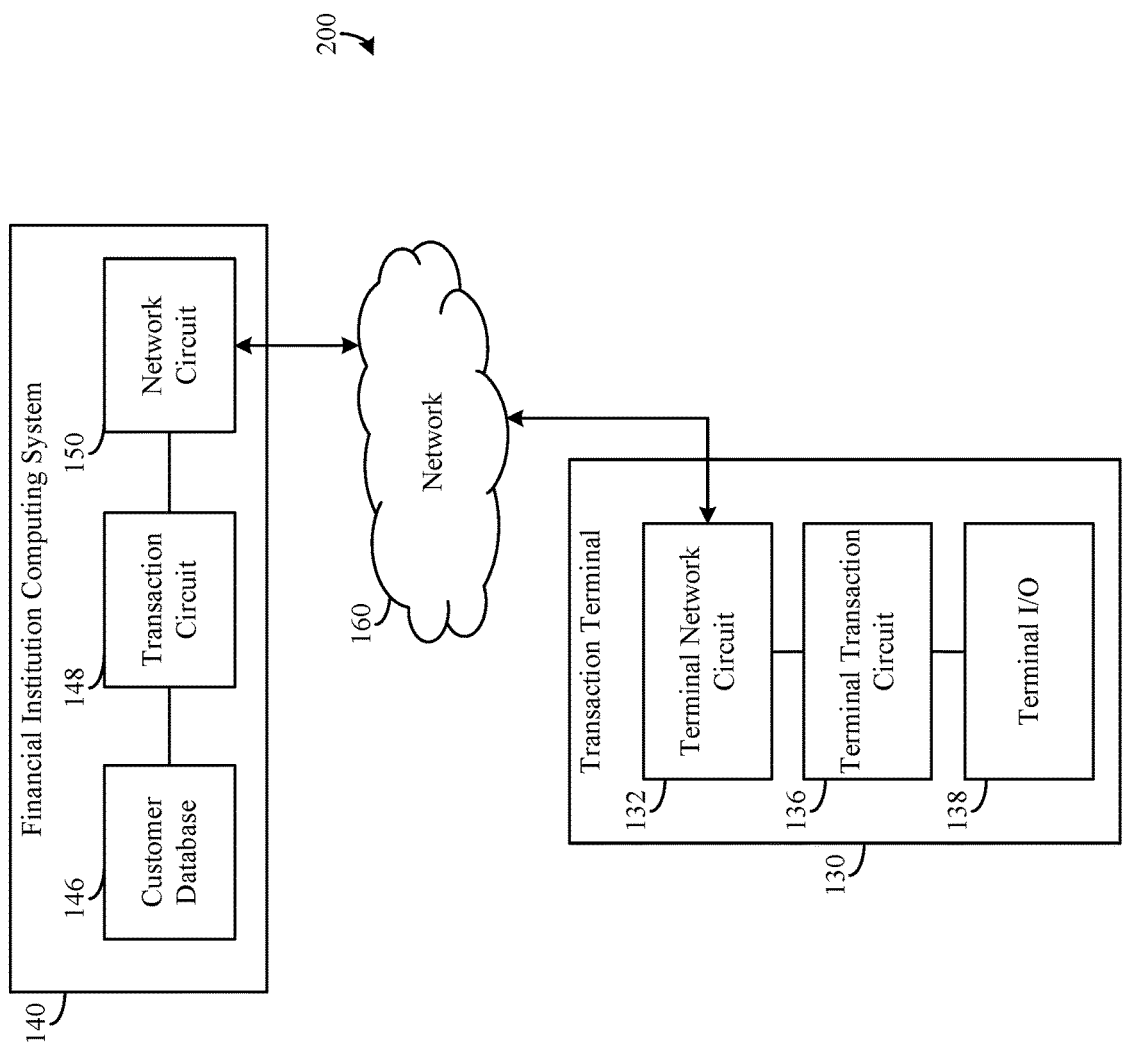
FIG. 2 is a block diagram illustrating an example embodiment of the transaction request authorizing system shown in FIG. 1.

Referring to FIG. 2, an example embodiment of the transaction request authorizing system 100 is shown in more detail as transaction system 200. Transaction system 200 includes example embodiments of the transaction terminal 130, network 160, and financial institution computing system 140 of FIG. 1.

In certain embodiments, transaction terminal 130 may include a terminal network circuit 132 enabling the transaction terminal 130 to exchange data over the network 160. In certain embodiments, transaction terminal 130 may also include a terminal transaction circuit 136 and a terminal I/O 138. The terminal I/O 138 may include hardware and associated logics configured to enable the transaction terminal 130 to exchange information with a user, for example a customer or a terminal attendant (e.g., a store clerk, restaurant attendant, etc.), if any. An input aspect of the terminal I/O 138 may allow a user to provide information to the transaction terminal 130, and may include, for example, a keypad, a keyboard, a mouse, a joystick, a touchpad, a touchscreen, a microphone, a camera, a scanner, a fingerprint scanner, facial recognition hardware or software, an eye scanner, a biometric data scanner, a sensor that detects movement, accelerometers, voice recognition hardware or software, a signature reader, a payment card reader, a payment device reader, an input device that may be able to communicate wirelessly or through a wired connection with another device, etc., or a combination thereof, and any other type of input devices that would allow a user to provide information that could be used to identify or authenticate a person, such as a customer, or that could capture information that could be used to identify or authenticate the person. An output aspect of the terminal I/O 138 may allow a user to receive information from the transaction terminal 130, and may include, for example, a display, an electronic message sender, a printer, a speaker, a vibrating component such as a motor, illuminating icons, LEDs, sounds, an output device that may be able to communicate wirelessly or through a wired connection with another device, etc., or a combination thereof, or any other type of output devices that can provide information.

In certain embodiments, terminal transaction circuit 136 may be configured to receive information, including, for example, transaction request information, a customer indicator or customer identifying information, from, for example, a customer or a terminal attendant, via the terminal I/O 138, assemble a corresponding transaction request, or transmit the transaction request to the financial institution computing system 140 over the network 160 via the terminal network circuit 132.

In certain embodiments, the financial institution computing system 140 may include a customer database 146 and a transaction circuit 148. In certain embodiments, the financial institution computing system 140 may further include a network circuit 150 enabling the financial institution computing system 140 to exchange information over the network 160.

In certain embodiments, the customer database 146 allows the financial institution computing system 140 to retrievably store customer information relating to one or more of the operations discussed herein, and may include non-transient data storage mediums (e.g., local disc, flash-based hard drives, solid state drives, or any other type of drives, network servers, and the like), remote data storage facilities (e.g., cloud servers), portable data storage mediums, or any other type of data storage mediums. In certain embodiments, the customer database 146 may include information relating to a plurality of users who are authorized to make transactions with a plurality of financial accounts (e.g., credit card accounts, savings accounts, checking accounts, etc.). Authorized users may include account owners, or other individuals designated as authorized users by a respective account owner.

In certain embodiments, customer database 146 may be configured to store information for a customer, including habit information of the customer and a customer indicator of the customer. The customer database 146 may store additional information associated with the customer, and the customer may be associated with a financial account of the financial institution. In certain embodiments, habit information of a customer may include any information about a customer's habits, including the customer's purchasing habits. In certain embodiments, habit information of a customer may include a customer's purchase history, including goods and services purchased, dates, times, locations, costs, amounts, etc., or any other information associated with a customer's purchase history. In certain embodiments, habit information may include, for example, goods and services purchased by the customer in the past, types of goods and services purchased in the past, locations where goods and services have been purchased by the customer, geographical areas where goods and services have been purchased by the customer, stores where goods and services have been purchased by the customer, merchants where goods and services have been purchased by the customer, types of stores and merchants where goods and services have been purchased by the customer, buildings where goods and services have been purchased by the customer, the type of transactions that the customer has conducted, the times or dates when goods and services have been purchased by the customer, amounts of goods and services purchased in the past, cost of goods and services purchased in the past, and any other information related to the customer's past activities, transactions or purchases may form a part of the habit information in the customer database 146.

In certain embodiments, the transaction circuit 148 may be configured to receive, over the network 160 via the network circuit 150, a first transaction request including the customer indicator. In certain embodiments, the transaction request may be initiated by the customer, or an attendant, using transaction terminal 130. In certain embodiments, the transaction circuit 148 may be further configured to authenticate the first transaction request by determining that a characteristic of the first transaction request conforms with the habit information stored in customer database 146 of the customer associated with the customer indicator. Transaction circuit 148 may be further configured to authorize the first transaction request based on the request being authenticated.

In certain embodiments, for example, the customer may be purchasing a good or service that is the same or similar, or that is of the same or similar type, as goods or services that the customer has purchased in the past. As another example, the customer may be purchasing a good or service in a location, store, type of store, building, geographical area, etc. that is the same or similar, or that is of the same or similar type, as a location, store, type of store, building, geographical area, etc. where the customer has purchased goods or services in the past. As another example, the customer may be conducting a transaction that is the same or similar, or that is of the same or similar type, as transactions that the customer has conducted in the past. As another example, the customer may be purchasing goods or services during a time or date that is the same or similar as times or dates when the customer has purchased similar goods or services in the past. As another example, the customer may be purchasing goods or services during a time of day, week, month, year, day of week, day of month, time of month, time of year, month of year, etc., or any other time or date that may be the same or similar as times, dates or periods when the customer has purchased goods or services in the past. For example, the customer may be conducting a transaction that he has conducted in the past on certain occasions, regularly, often, on most work days, some weekends, sometimes on Mondays, most Mondays, etc., or may be conducting a transaction at a store, coffee shop or restaurant that the customer frequents regularly, on most works days, on most weekends, every Monday, some Mondays, etc., or at a store or merchant that the customer has gone to a number of times in the past. As another example, the customer may typically buy coffee in the morning, or may habitually purchase a particular good (e.g., a vehicle or a cake) during a particular month, or every certain number of days, months or years, etc., and he may be attempting to do so again. As another example, the customer may be attempting to make a purchase at a vendor that the frequents often or regularly. Any one or more of the example characteristics of a transaction request described herein, or any other characteristics that may be associated with a transaction request, may be stored in the habit information in customer database 146. In certain embodiments, transaction circuit 148 may compare one or more characteristics of a first transaction request with the habit information stored in the customer database 146, to determine whether a characteristic of the transaction request conforms with the habit information of the customer stored in the customer database 146.

In certain embodiments, transaction circuit 148 may automatically store and update habit information in the customer database 146 over time as a customer conducts transactions. In certain embodiments, a customer may also be provided with the ability to manually create, supplement or amend his or her habit information in customer database 146. In certain embodiments, a customer may also be provided with the ability to create or change his or her customer indicator at any time. In certain embodiments, for example, a customer may create the customer indicator prior to the first transaction request, or during the first transaction, and may be able to change the customer indicator at any time, including for example, during the first transaction, or after the first transaction but before the second transaction request. For example, a website, including a website of the financial institution computing system 140, may enable the customer to create, supplement or amend his or her habit information in customer database 146, or to create or change his or her customer indicator. In certain embodiments, terminal I/O 138 of transaction terminal 130 may enable the customer to create, supplement or amend his or her habit information in customer database 146, or to create or change his or her customer indicator. Other conduits may also be provided to allow a customer to manually access, create, supplement or amend his or her habit information in customer database 146, or to create or change the customer indicator.

In some embodiments, transaction circuit 148 may be configured to use the customer indicator received with a transaction request to identify the customer or locate the habit information of the customer in the customer database 146. In some embodiments, transaction circuit 148 may be configured to receive and use other or additional identifying information to identify the customer or locate the habit information of the customer in the customer database 146. In certain embodiments, a customer indicator may include letters, numbers or special characters. In some embodiments, a customer indicator may include other or additional identifying information, as will be further described below.

For example, in some embodiments the transaction circuit 148 may be configured to use the customer indicator to identify the customer, authenticate the customer, or locate the habit information of the customer stored in the customer database 146. In certain embodiments, the transaction circuit 148 may be configured to use additional or other identifying information to identify the customer, authenticate the customer, or locate the habit information of the customer. In certain embodiments, for example, transaction circuit 148 may be configured to receive a first transaction request including the name of the customer or part of the name of the customer. In certain embodiments, transaction circuit 148 may be configured to use the name or part of the name of the customer to identify the customer, authenticate the customer, or locate the habit information of the customer stored in the customer database 146. Similarly, in certain embodiments, the transaction circuit 148 may be configured to receive an answer to a security question or a challenge question, and may use the answer to identify the customer, authenticate the customer, or locate the habit information of the customer stored in the customer database 146. Alternatively, or in addition, the transaction circuit 148 may be configured to receive as part of the first transaction request, any other information that may be used by the transaction circuit 148 to identify the customer, authenticate the customer, or locate the habit information of the customer stored in the customer database 146, such as, a password, a login identifier, a personal identifier, an email address, a phone number, a zip code, an address, a location, a PIN, a photograph, biometric data, facial data, voice data, a pattern, a pattern drawn by the customer (e.g., on a screen), a pattern of movement, a signature, a fingerprint scan, an eye scan, etc., or a combination thereof. Any such identifying information, alone or in combination, may be the customer indicator, may form part of the customer indicator, or may be used by the transaction circuit 148 in addition to the customer indicator, or instead of the customer indicator, to identify the customer, authenticate the customer, or locate the habit information of the customer stored in the customer database 146

In certain embodiments, a customer may be able to conduct additional habitual or non-habitual transactions using the customer indicator after transaction circuit 148 authorizes the first transaction request. For example, transaction circuit 148 may be further configured to receive, over the network 160 via the network circuit 150, a second transaction request including the customer indicator. The transaction circuit 148 may be further configured to authorize the second transaction request in response to receiving the customer indicator. In certain embodiments, the transaction circuit 148 may be configured to authorize the second transaction request in response to receiving the customer indicator and without receiving any other identifying information of the customer.

In certain embodiments, the transaction circuit 148 may be configured to send, over the network 160 via the network circuit 150, a confirmation to a transaction terminal associated with the transaction request. In certain embodiments, for example, the transaction circuit 148 may be configured to send, over the network 160 via the network circuit 150, a confirmation to a transaction terminal used to initiate the first transaction request, a confirmation to a transaction terminal used to initiate the second transaction request, or both.

In certain embodiments, the transaction circuit 148 may be configured to authorize the second transaction request without determining that a characteristic of the second transaction request conforms with the habit information of the customer stored in the customer database 146. In certain embodiments, authorizing one or both of the transaction requests may be further based on determining that the customer has sufficient credit or funds in a financial account at the financial institution.

In certain embodiments, in addition to receiving the customer indicator, the transaction circuit 148 may be configured to also receive as part of the second transaction request, over the network 160 via the network circuit 150, additional data or information that may be used to identify the customer or authenticate the customer as described above for the first transaction request (e.g., a name, part of a name, an answer to a security question, a password, a fingerprint scan, etc.). In certain embodiments, the transaction circuit 148 may be configured to authorize the second transaction request only if said additional identifying information is received.

It should be noted that a second transaction request may refer to any transaction request occurring after the first transaction request, including a transaction request after other transaction requests that occur after the first transaction request. For example, zero, one or more transaction requests may occur between the first transaction request and the second transaction request.

In certain embodiments, one or both of the transaction requests may be initiated with or without the customer presenting a payment card or a payment device when initiating the transaction request. In certain embodiments, the transaction circuit 148 may be configured to authorize the first transaction request with or without receiving a payment card number, or an account number associated with the customer's financial account, as part of the first transaction request. In certain embodiments, the transaction circuit 148 may be configured to authorize the second transaction request with or without receiving a payment card number, or an account number associated with the customer's financial account, as part of the second transaction request. In certain embodiments, the transaction circuit 148 may be configured to authorize the second transaction request with or without the customer presenting any physical form of identification when initiating the second transaction request (e.g., such as a passport, driver's license, image in a mobile device, etc.). In certain embodiments, the transaction circuit 148 may be configured to authorize the first transaction request with or without the customer presenting any physical form of identification when making the first transaction request.

In certain embodiments, in addition to receiving the customer indicator, the transaction circuit 148 may be configured to only authorize the second transaction request if one or more conditions are met. For example, in certain embodiments, the transaction circuit 148 may be configured to only authorize the second transaction request if, in addition to receiving the customer indicator, the transaction circuit 148 determines that the second transaction request occurred within a certain period of time after the first transaction request (e.g., within certain hours, in the same day, etc.), or at a geographic location within a certain distance from a geographic location of the first transaction request (e.g., within certain miles, within the same city, within the same region, within the same shopping center, within the same outlet center, on the same street, etc.).

As an additional example, in certain embodiments, the transaction circuit 148 may be configured to only authorize the second transaction request if, in addition to receiving the customer indicator, the transaction circuit 148 determines that the second transaction request is for an amount of money that does not exceed a threshold amount of money. For example, transaction circuit 148 may only authorize a second transaction request for items that do not exceed a certain threshold cost, but may not authorize the second transaction request for items that exceed the threshold cost. As an additional example, in certain embodiments, the transaction circuit 148 may be configured to only authorize the second transaction request if, in addition to receiving the customer indicator, the transaction circuit 148 determines that the second transaction request is for an amount of money that, added to the cumulative amount of money that has been spent by the customer since the first transaction request, would not exceed a threshold amount of money. For example, transaction circuit 148 may only authorize a second transaction request for items that, added to the cumulative amount that has been spent by the customer since the first transaction request using, for example, the same financial account, do not exceed a threshold amount of money, but may not authorize the second transaction request for items that, added to the cumulative amount, exceed the threshold amount. As an additional example, in certain embodiments the transaction circuit 148 may be configured to only authorize the second transaction request if, in addition to receiving the customer indicator, the transaction circuit 148 determines that the number of transaction requests received since the first transaction request do not exceed a threshold number of transactions (e.g., only certain number of transactions after the first transaction request may be authorized using the customer indicator). In certain embodiments, the transaction circuit 148 may be configured to only authorize the second transaction request if, in addition to receiving the customer indicator, the transaction circuit 148 determines that a combination of one or more of the aforementioned conditions have also been met (e.g., no more than certain amount and within a certain time from the first request, no more than certain amount and within a certain distance from the first request, etc.).

In certain embodiments, the transaction circuit 148 may be configured to send, over the network 160 via the network circuit 150, a message to the customer. In certain embodiments, the message may indicate that the customer indicator has been authenticated and can be used for conducting non-habitual transactions. In certain embodiments, the message may indicate that the customer indicator can be used for conducting additional transactions, that the customer indicator can be used for conducting non-habitual transactions, or that the customer indicator can be used for conducting transactions subsequent to a first transaction. In certain embodiments, the message may specify certain limits or conditions, such as those described above. For example, the message may specify a threshold amount of money that may be spent for a particular transaction, the total collective amount of money that may be spent using the customer indicator, the total number of transactions that may be made using the customer indicator, the total number of non-habitual transactions that may be made using the customer indicator, etc., or a combination thereof. In certain embodiments, the message may specify other or additional conditions or limits, such as an explanation that the customer indicator can only be used for a certain period of time (e.g., for certain hours, for the remainder of the day, etc.), within a certain distance of the first transaction (e.g., within certain miles or within a certain region), etc., or a combination thereof. The messages may be sent via text, voice-mail, email, or via any other method where the customer may be able to receive the message, view the message or hear the message. For example, the customer may receive, view or hear the message via a computer, tablet, smartphone, mobile device, smartwatch, infotainment system of a vehicle, a computing device in an appliance, a smart TV, etc.

In certain embodiments, once one or more of the limits as described above are reached, the transaction circuit 148 may be configured to send, over the network 160 via the network circuit 150, a message to the customer indicating that the customer indicator can no longer be used, can no longer be used for non-habitual transactions, has to be used for a habitual transaction before it can be used for additional non-habitual transactions, etc., or a combination thereof. The messages may be sent via text, voice-mail, email, or via any other method where the customer may be able to receive the message, view the message or hear the message, including for example, using a computer, tablet, smartphone, mobile device, smartwatch, infotainment system of a vehicle, a computing device in an appliance, a smart TV, etc.

Figure 3:
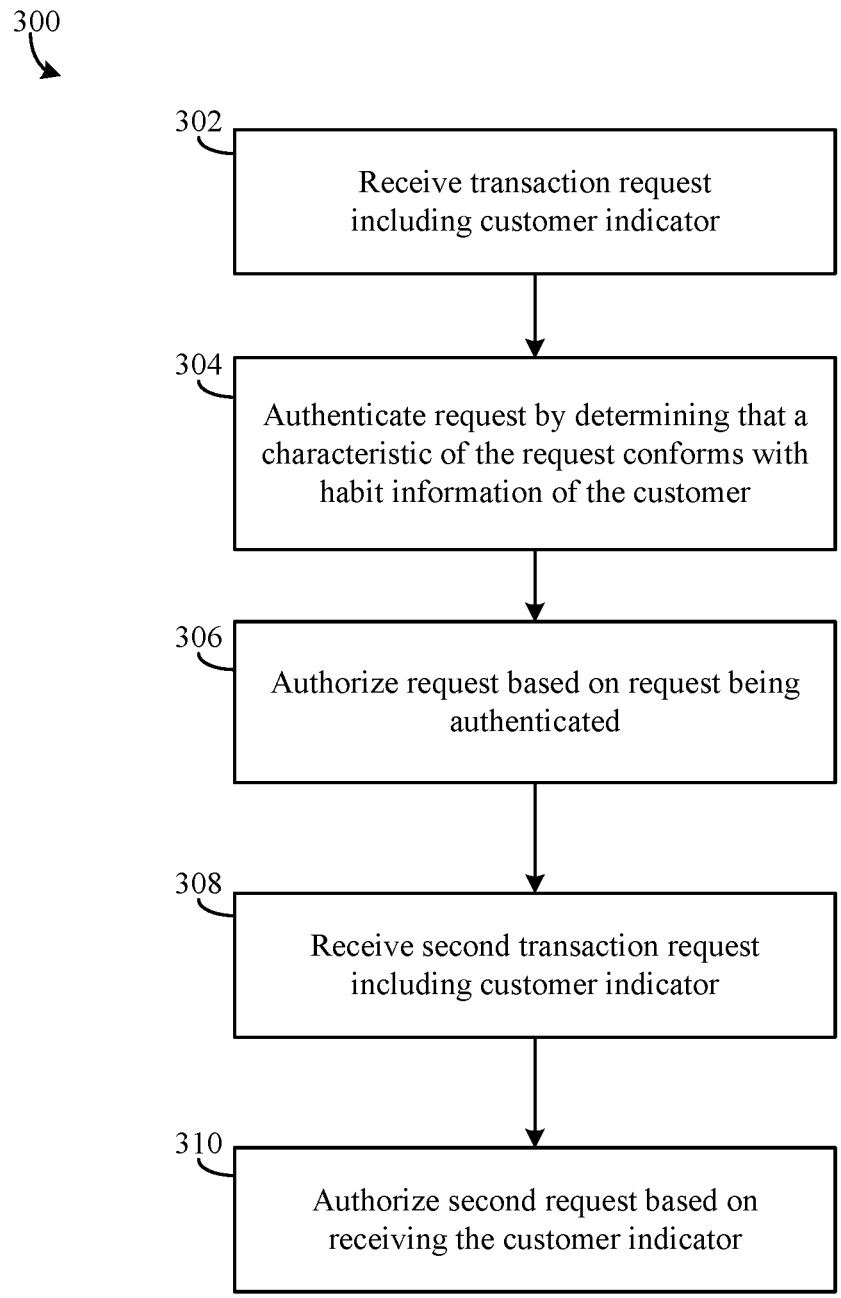
FIG. 3 is a flowchart of a method of authorizing a transaction request, according to an example embodiment.

Referring now to FIG. 3, a flowchart of a method 300 of authorizing transaction requests according to an example embodiment is shown. The method 300 may be performed by a financial institution computing system (e.g., the financial institution computing system 140 of FIGS. 1 and 2).

At step 302, a transaction request is received. In certain embodiments, the transaction request may be received by a transaction circuit of a financial institution (e.g., transaction circuit 148), over a network (e.g., the network 160), via a network circuit of the financial institution (e.g., the network circuit 150). In certain embodiments, the transaction request may include a customer indicator of a customer of the financial institution. In certain embodiments, the customer indicator may be stored in a customer database of the financial institution (e.g., customer database 146), and the customer may be associated with a financial account of the financial institution.

At step 304, the transaction request is authenticated. In certain embodiments, the transaction request may be authenticated by the transaction circuit of the financial institution.

In certain embodiments, the transaction request may be authenticated by determining that a characteristic of the transaction request conforms with habit information of the customer associated with the customer indicator. In certain embodiments, the habit information of the customer may be stored in the customer database of the financial institution. At step 306, the transaction request is authorized based on the transaction request being authenticated.

At step 308, a second transaction request is received. In certain embodiments, the transaction request may be received by the transaction circuit of the financial institution, and may include the customer indicator. At step 310, the second transaction request is authorized. In certain embodiments, the transaction request may be authorized by the transaction circuit of the financial institution based on receiving the customer indicator.

As explained above, in certain embodiments, one or more of the transaction requests may be initiated, e.g., at a transaction terminal at a merchant (e.g., transaction terminal 130), without the customer presenting a payment card or a payment device. Similarly, in certain embodiments, one or more of the transaction requests may be authorized by the transaction circuit of the financial institution without receiving a payment card number, or an account number associated with the customer's financial account, as part of the transaction requests.

In certain embodiments, as explained above, authorizing the second transaction request may be further based on determining whether certain conditions have been met. For example, authorizing the second transaction request may be further based on determining that the second transaction request occurred within a certain period of time after the first transaction request, or at a geographic location within a certain distance from the location of the first transaction request. As an additional example, authorizing the second transaction request may be further based on determining that the second transaction request is for an amount of money that does not exceed a threshold amount of money. As an additional example, authorizing the second transaction request may be further based on determining that the number of transaction requests received after the first transaction request do not exceed a threshold number of transactions. As an additional example, authorizing the second transaction request may be further based on determining that the second transaction request is for an amount of money that, added to the cumulative amount of money spent by the customer after the first transaction request, would not exceed a threshold amount of money.

In certain embodiments, as also explained above, authorizing a transaction request may be further based on receiving additional identifying information (e.g., a name, part of a name, an answer to a security question, a fingerprint scan, etc.). In certain embodiments, as also explained above, authorizing a transaction request may be further based on determining that the customer has sufficient credit or funds in a financial account at the financial institution to complete the transaction requested.

Embodiments of the transaction request authorizing system 100 and 200 include non-transitory computer readable media having computer-executable instructions embodied therein that, when executed by transaction circuit 148 of financial institution computer system 140, causes the financial institution computing system 140 to perform operations described herein, including operations to authenticate or authorize transaction requests described herein, or any operation that may be performed by any embodiments of financial institution computing system 140.

The embodiments described herein have been described with reference to drawings. The drawings illustrate certain details of embodiments that implement example systems, methods, non-transitory computer readable media having computer-executable instructions, and programs described herein. However, describing example embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

It should be further understood that "or" should be construed as inclusive or, such that, for example, "A or B" means A, B, or A and B, and for example, "A, B, or C" means A, B, C, or any combination thereof (e.g., A and B, A and C, B and C).

It should be further understood that a database that may be described as two or more databases in the example embodiments or claims may be implemented as one database. It should be further understood that a database that may be described as one database in the example embodiments or claims may be implemented as two or more databases. It should be further understood that a circuit that may be described as two or more circuits in the example embodiments or claims may be implemented as one circuit. It should be further understood that a circuit that may be described as one circuit in the example embodiments or claims may be implemented as two or more circuits.

It should be further understood that "a" and "an" are not limited to a single instance and should be construed as "one or more," such that, for example, a database "storing information for a customer," is a database storing information for one or more customers.

As used herein, the term "circuit" may include hardware structured to execute the functions described herein. In some embodiments, each respective "circuit" may execute, or include machine-readable media for configuring the hardware to execute, the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In certain embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices as those described herein and any other input devices capable of performing similar functions. Comparatively, the term "output device," as described herein, may include any type of output device or output devices as those described herein, any other output devices capable of performing similar functions.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined and form part of the same step, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of example embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain examples of the disclosure and its practical application to enable one skilled in the art to utilize various embodiments and with various modifications as may be suited to any particular use contemplated. Other substitutions, modifications, changes, and omissions may be made in the design, operating conditions, and arrangement of the embodiments without departing from the scope of the present disclosure as expressed in the appended claims.

What is claimed is:

1. A financial institution computing system comprising:
a customer database configured to store information for a customer, the information comprising habit information of the customer and a customer indicator of the customer; and
a transaction circuit configured to:
receive, from a first point-of-sale (POS) terminal at a first location, a habitual transaction request including the customer indicator, wherein the habitual transaction request is a first type of transaction to be authorized based on the habit information of the customer and the customer indicator;
identify characteristics of the habitual transaction request, wherein the characteristics comprise a first geographic location and at least one of a transaction amount or a type of merchant;
identify, utilizing the customer indicator, the habit information of the customer stored in the customer database;
authenticate the habitual transaction request based on the characteristics of the habitual transaction request conforming with the habit information of the customer;
in response to authenticating the habitual transaction request, authorize the habitual transaction request;
receive, from a second POS terminal at a second location, a non-habitual transaction request including the customer indicator, wherein the non-habitual transaction request is a second type of transaction to be authorized based on the customer indicator with no other information from the customer;
determine that the customer is active, and the customer indicator is approved to conduct a non-habitual transaction based on the habitual transaction request being authenticated using the habit information at the first POS terminal;
authorize the non-habitual transaction request based on the determination that the customer is active, and the customer indicator is approved to conduct the non-habitual transaction based on the habitual transaction request being authenticated using the habit information at the first POS terminal;
transmit a confirmation to the second POS terminal used to initiate the non-habitual transaction request and indicating the non-habitual transaction request was authorized; and
wherein the habitual transaction request and the non-habitual transaction request are both initiated without the customer presenting a payment card or a payment device.

2. The financial institution computing system of claim 1, the transaction circuit further configured to:
determine the customer indicator is approved to conduct the non-habitual transaction by determining that the customer indicator meets conditions associated with a financial account of the customer.

3. The financial institution computing system of claim 2, wherein the conditions comprise a second geographic location of the non-habitual transaction request being within a threshold distance from the first geographic location of the habitual transaction request and at least one of a total amount of money authorized for the non-habitual transaction being within a first limit or a total number of non-habitual transactions being within a second limit.

4. The financial institution computing system of claim 1, wherein the habitual transaction request and the non-habitual transaction request are both initiated without the customer presenting any payment information.

5. The financial institution computing system of claim 1, wherein authorizing the non-habitual transaction request is further based on determining that the non-habitual transaction request occurred within a period of time after the habitual transaction request.

6. The financial institution computing system of claim 1, wherein authorizing the non-habitual transaction request is further based on determining that a number of transaction requests received after the habitual transaction request do not exceed a total number of non-habitual transactions.

7. The financial institution computing system of claim 1, wherein the customer indicator further comprises letters, numbers, or special characters, and wherein the letters, numbers, or special characters are based on a name of the customer, part of the name of the customer, an answer to a security or challenge question, an email address, or a phone number.

8. The financial institution computing system of claim 1, wherein the customer indicator further comprises biometric data, voice data, or a pattern, and wherein the biometric data, the voice data, or the pattern are identifying information identifying the customer stored in the customer database.

9. The financial institution computing system of claim 1, wherein authorizing at least one of the habitual transaction request or the non-habitual transaction request is further based on receiving an answer to a security question and comparing the answer with information stored in the customer database.

10. A method comprising:
receiving, by a transaction circuit from a first point-of-sale (POS) terminal at a first location, a habitual transaction request including a customer indicator of a customer, wherein the habitual transaction request is a first type of transaction to be authorized based on habit information of the customer and the customer indicator;
identifying, by the transaction circuit, characteristics of the habitual transaction request, wherein the characteristics comprise a first geographic location and at least one of a transaction amount or a type of merchant;
identifying, by the transaction circuit utilizing the customer indicator, habit information of a customer stored in a customer database;
authenticating, by the transaction circuit, the habitual transaction request based on the characteristics of the habitual transaction request conforming with the habit information of the customer;
in response to authenticating the habitual transaction request, authorizing, by the transaction circuit, the habitual transaction request;
receiving, by the transaction circuit from a second POS terminal at a second location, a non-habitual transaction request including the customer indicator, wherein the non-habitual transaction request is a second type of transaction to be authorized based on the customer indicator with no other information from the customer;
determining, by the transaction circuit, that the customer is active, and the customer indicator is approved to conduct a non-habitual transaction based on the habitual transaction request being authenticated using the habit information at the first POS terminal;
authorizing, by the transaction circuit, the non-habitual transaction request based on the determination that the customer is active, and the customer indicator is approved to conduct the non-habitual transaction based on the habitual transaction request being authenticated using the habit information at the first POS terminal;
transmitting, by the transaction circuit, a confirmation to the second POS terminal used to initiate the non-habitual transaction request and indicating the non-habitual transaction request was authorized; and
wherein the habitual transaction request and the non-habitual transaction request are both initiated without the customer presenting a payment card or a payment device.

11. The method of claim 10, further comprising:
determining, by the transaction circuit, the customer indicator is approved to conduct the non-habitual transaction by determining that the customer indicator meets conditions associated with a financial account of the customer.

12. The method of claim 11, wherein the conditions comprise a second geographic location of the non-habitual transaction request being within a threshold distance from the first geographic location of the habitual transaction request and at least one of a total amount of money authorized for the non-habitual transaction being within a first limit or a total number of non-habitual transactions being within a second limit.

13. The method of claim 10, wherein the habitual transaction request and the non-habitual transaction request are both initiated without the customer presenting any payment information.

14. The method of claim 10, wherein authorizing the non-habitual transaction request is further based on determining that the non-habitual transaction request occurred within a period of time after the habitual transaction request.

15. The method of claim 10, wherein authorizing the non-habitual transaction request is further based on determining that a number of transaction requests received after the habitual transaction request do not exceed a total number of non-habitual transactions.

16. The method of claim 10, wherein the customer indicator further comprises letters, numbers, or special characters, and wherein the letters, numbers, or special characters are based on a name of the customer, part of the name of the customer, an answer to a security or challenge question, an email address, or a phone number.

17. The method of claim 10, wherein the customer indicator further comprises biometric data, voice data, or a pattern, and wherein the biometric data, the voice data, or the pattern are identifying information identifying the customer stored in the customer database.

18. The method of claim 10, wherein authorizing at least one of the habitual transaction request or the non-habitual transaction request is further based on receiving an answer to a security question and comparing the answer with information stored in the customer database.

19. One or more non-transitory computer-readable storage media having instructions stored thereon that, when executed by at least one processing circuit, cause the at least one processing circuit to:
receive, from a first point-of-sale (POS) terminal at a first location, a habitual transaction request including a customer indicator of a customer, wherein the habitual transaction request is a first type of transaction to be authorized based on habit information of the customer and the customer indicator;
identify characteristics of the habitual transaction request, wherein the characteristics comprise a first geographic location and at least one of a transaction amount or a type of merchant;
identify, utilizing the customer indicator, habit information of a customer stored in a customer database;
authenticate the habitual transaction request based on the characteristics of the habitual transaction request conforming with the habit information of the customer;
in response to authenticating the habitual transaction request, authorize the habitual transaction request;
receive, from a second POS terminal at a second location, a non-habitual transaction request including the customer indicator, wherein the non-habitual transaction request is a second type of transaction to be authorized based on the customer indicator with;
determine that the customer is active, and the customer indicator is approved to conduct a non-habitual transaction based on the habitual transaction request being authenticated using the habit information at the first POS terminal;
authorize the non-habitual transaction request based on the determination that the customer is active, and the customer indicator is approved to conduct the non-habitual transaction based on the habitual transaction request being authenticated using the habit information at the first POS terminal;

transmit a confirmation to the second POS terminal used to initiate the non-habitual transaction request and indicating the non-habitual transaction request was authorized; and wherein the habitual transaction request and the non-habitual transaction request are both initiated without the customer presenting a payment card or a payment device.

20. The one or more non-transitory computer-readable storage media of claim 19, having instructions stored thereon that, when executed by the at least one processing circuit, cause the at least one processing circuit to:

determine the customer indicator is approved to conduct the non-habitual transaction by determining that the customer indicator meets conditions associated with a financial account of the customer, wherein the conditions comprise a second geographic location of the non-habitual transaction request being within a threshold distance from the first geographic location of the habitual transaction request and at least one of a total amount of money authorized for the non-habitual transaction being within a first limit or a total number of non-habitual transactions being within a second limit.

\* \* \* \* \*